(12) United States Patent
Brockhaus et al.

(10) Patent No.: US 10,712,185 B2
(45) Date of Patent: Jul. 14, 2020

(54) MAGNETIC-INDUCTIVE FLOWMETER AND METHOD FOR OPERATING A MAGNETIC-INDUCTIVE FLOWMETER

(71) Applicant: KROHNE Messtechnik GmbH, Duisburg (DE)

(72) Inventors: Helmut Brockhaus, Oberhausen (DE); Wilhelm Florin, Duisburg (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 542 days.

(21) Appl. No.: 14/320,943

(22) Filed: Jul. 1, 2014

(65) Prior Publication Data

US 2015/0000421 A1 Jan. 1, 2015

(30) Foreign Application Priority Data

Jul. 1, 2013 (DE) .......................... 10 2013 010 891

(51) Int. Cl.
| | |
|---|---|
| *G01R 15/00* | (2006.01) |
| *G01F 1/58* | (2006.01) |
| *G01F 1/60* | (2006.01) |
| *G01N 27/08* | (2006.01) |

(52) U.S. Cl.
CPC ............... *G01F 1/588* (2013.01); *G01F 1/60* (2013.01); *G01N 27/08* (2013.01)

(58) Field of Classification Search
CPC ............ G01F 1/60; G01F 1/588; G01N 27/08
USPC ............... 702/28, 57, 61, 62, 100, 179, 182; 73/861.12
See application file for complete search history.

(56) References Cited

U.S. PATENT DOCUMENTS

| | | | | |
|---|---|---|---|---|
| 4,969,363 | A | | 11/1990 | Mochizuki |
| 5,524,493 | A | | 6/1996 | Yoshida |
| 5,625,155 | A | | 4/1997 | Yoshida |
| 5,905,206 | A | * | 5/1999 | Herwig ..................... G01F 1/60 73/861.12 |
| 6,034,515 | A | * | 3/2000 | Hirmer .................. H02H 9/001 323/277 |
| 6,644,127 | B1 | * | 11/2003 | Matzen ............... G01F 25/0007 73/861.12 |
| 6,804,613 | B2 | * | 10/2004 | Ishikawa ................... G01F 1/60 141/94 |

(Continued)

FOREIGN PATENT DOCUMENTS

| | | |
|---|---|---|
| DE | 692 32 633 T2 | 9/2002 |
| DE | 102 43 748 A1 | 4/2003 |

(Continued)

*Primary Examiner* — Michael P Nghiem

(74) *Attorney, Agent, or Firm* — David S. Safran; Roberts Calderon Safran & Cole, P.C.

(57) ABSTRACT

A magnetic-inductive flowmeter and method in which a control circuit and/or evaluation circuit is designed/operated in such a manner that a measuring voltage tapped or tappable by measuring electrodes for flow measurement are evaluated only during a flow measuring time that is less than half the duration of the period of generation of the magnetic field and that the control circuit is designed/operated in such a manner that the measuring electrodes are impinged with conductivity measuring signals only during a conductivity measuring time that lies outside the flow measuring time.

16 Claims, 6 Drawing Sheets

(56) References Cited

U.S. PATENT DOCUMENTS

| | | | | |
|---|---|---|---|---|
| 2003/0015042 A1* | 1/2003 | Florin | ........................ | G01F 1/60 |
| | | | | 73/861.12 |
| 2006/0116854 A1* | 6/2006 | Brockhaus | .............. | G01D 18/00 |
| | | | | 702/183 |
| 2008/0262796 A1* | 10/2008 | Rufer | ...................... | G01F 1/584 |
| | | | | 702/184 |
| 2009/0260452 A1* | 10/2009 | Rasmussen | ............. | G01F 1/588 |
| | | | | 73/861.12 |
| 2010/0128898 A1* | 5/2010 | Wong | ..................... | H03F 1/305 |
| | | | | 381/94.5 |
| 2012/0105333 A1* | 5/2012 | Maschmeyer | .......... | G06F 3/016 |
| | | | | 345/173 |
| 2014/0145638 A1* | 5/2014 | Terdan | .................... | H05B 37/02 |
| | | | | 315/250 |
| 2015/0007670 A1* | 1/2015 | Brockhaus | ................ | G01F 1/58 |
| | | | | 73/861.12 |
| 2015/0177035 A1* | 6/2015 | Rovner | ................... | G01F 1/584 |
| | | | | 73/861.12 |
| 2015/0268076 A1* | 9/2015 | Florin | ........................ | G01F 1/60 |
| | | | | 73/861.12 |

FOREIGN PATENT DOCUMENTS

| | | | | |
|---|---|---|---|---|
| DE | 102 08 258 A1 | | 9/2003 | |
| DE | 102014004122 | * | 8/2015 | |
| EP | 0336615 A1 * | | 10/1989 | ............. G01F 1/002 |
| EP | 0 704 682 A2 | | 4/1996 | |
| JP | H07248240 A | | 9/1995 | |

\* cited by examiner

MAGNETIC-INDUCTIVE FLOWMETER AND METHOD FOR OPERATING A MAGNETIC-INDUCTIVE FLOWMETER

BACKGROUND OF THE INVENTION

Field of the Invention

The invention relates to a magnetic-inductive flowmeter and a method for operating a magnetic-inductive flowmeter.

Description of Related Art

Thus, the subject-matter of the invention is initially a magnetic-inductive flowmeter, having at least one measuring tube for the flow of an electrically conductive medium, having at least one magnetic field generator for generating at least one changing magnetic field running at least partially perpendicular to the longitudinal axis of the measuring tube, having at least two measuring electrodes—in particular, contacting the medium—, having a signal voltage source or signal current source connected to the measuring electrodes for generating conductivity measuring signals, having a control circuit for the magnetic field generator and for the signal voltage source or the signal current source as well as having an evaluation circuit.

Magnetic-inductive flowmeters have been known extensively in the prior art for decades. As an example, reference is made here to the citation "Technische Durchflussmessung" by professor Dr.-Ing. K. W. Bonfig, $3^{rd}$ Edition, Vulkan-Verlag, Essen, pages 123 to 167 and to the citation "Grundlagen Magnetisch-Induktive Durchflussmessung" by Dipl.-Ing. Friedrich Hoffmann, $3^{rd}$ Edition, 2003, publication of the company KROHNE Messtechnik GmbH & Co. K G.

The basic principle of a magnetic-inductive flowmeter for flow measurement of a flowing medium is traced back to Michael Faraday, who proposed, in 1832, the use of the principle of electromagnetic induction for measuring the flow velocity of an electrically conductive medium.

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field fluctuating over time during the measurement process is generated by means of a magnetic field generator having at least one magnetic field coil, normally two magnetic field coils, and the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

As mentioned above, if the magnetic-inductive flowmeter being described here has at least one magnetic field generator "for generating a magnetic field running perpendicular to the longitudinal axis of the measuring tube", then it is mentioned here that the magnetic field preferably runs perpendicular to the longitudinal axis of the measuring tube or perpendicular to the direction of flow of the medium; however, it is sufficient when a component of the magnetic field runs perpendicular to the longitudinal axis of the measuring tube or perpendicular to the direction of flow of the medium.

It is also described above that the magnetic-inductive flowmeter described here also has at least two measuring electrodes—in particular, contacting the medium. These measuring electrodes are used for tapping a measuring voltage induced in a flowing medium. Preferably, the virtual connection line of the two measuring electrodes runs essentially perpendicular to the direction of the magnetic field interfusing the measuring tube perpendicular to the longitudinal axis of the measuring tube. In particular, the measuring electrodes can be provided in such a manner that their virtual connection line actually runs—more or less—perpendicular to the direction of the magnetic field interfusing the measuring tube.

Finally, it is described above that the measuring electrodes are, in particular, such that they come into contact with the medium. Indeed, of course, the electric field strength generated by induction in the flowing, electrically conductive medium can be tapped by direct, i.e., galvanic measuring electrodes in contact with the medium as a measuring voltage. However, there are magnetic-inductive flowmeters in which the measuring voltage is not tapped by direct, i.e., non-galvanic, measuring electrodes in contact with the medium, rather the measuring voltage is capacitively determined.

The primary use of magnetic-inductive flowmeters of the type described here is naturally the measurement of the flow of a medium through a measuring tube, namely a medium that has at least a low electric conductivity, i.e., flow measurement. However, the use of magnetic-inductive flowmeters is not limited to this use. In particular, magnetic-inductive flowmeters can also be used particularly for conductivity measurement.

Magnetic-inductive flowmeters can be used for conductivity measurement when the conductivity of the medium whose flow is to be measured, for whatever reason, is of interest or importance. In particular, however, the conductivity of the medium whose flow is to be measured, is of importance for flow measurement itself because the measuring voltage tappable at the measuring electrodes is not only dependent on the magnetic field strength of the magnetic field generated by the magnetic field generator and the flow to be measured, but moreover also on the conductivity of the medium whose flow is to be measured.

The magnetic-inductive flowmeter described above is such that it is used and suitable not only for flow measurement, but also for conductivity measurement, namely,—for conductivity measurement—it has a signal voltage source or a signal current source with which conductivity signals are generated.

Magnetic-inductive flowmeters of the type described above, which are also used and suitable for conductivity measurement, are known, for example, from European patent 0 704 682, German Patent DE 692 32 633 C2, as well as from German Application DE 102 43 748 A1 and corresponding U.S. Pat. No. 6,804,613 B2 and German Application 10 208 258 A1.

SUMMARY OF THE INVENTION

The primary object of the present invention is to improve the known magnetic-inductive flowmeter that form the basis of the invention and to provide a particularly suitable method for operating a magnetic-inductive flowmeter, with which conductivity measurement can also be carried out.

The magnetic-inductive flowmeter according to the invention is initially and essentially wherein the control circuit and/or the evaluation circuit is/are designed in such a manner that the measuring voltage tapped or tappable by the measuring electrodes for flow measurement are evaluated only during a flow measuring time that is less than half the duration of the period of generation of the magnetic field and that the control circuit is designed in such a manner that the measuring electrodes are impinged with conductivity measuring signals only during a conductivity measuring time that is separate from the flow measuring time.

As mentioned above, magnetic-inductive flowmeters of the type forming the subject matter of the present invention have a magnetic field generator for generating a changing magnetic field running at least partially perpendicular to the longitudinal axis of the measuring tube. Thus magnetic field generators have, as a functional necessity, by all means, a magnetizing current source and at least one magnetic field coil, normally two magnetic field coils. The magnetizing current source generates, as described, a changing magnetic field. This is not a sine-shaped magnetic field, but one that is a result of the magnetic field coil or the magnetic field coils having direct current with alternating polarity flowing through it/them, namely during the first half of the duration of the period in one direction and during the second half of the duration of the period in the other direction.

It holds true for the magnetic field that is generated by the magnetizing current in the field coil or field coils that it does not exactly follow the chronological sequence of the magnetizing current in its chronological sequence. For the magnetic field, in fact, there is, namely, initially, an engaging phase at the beginning of the flowing direct current and a settling phase at the end of the flowing direct current. The magnetic field is constant after the end of the engaging phase and before the beginning of the settling phase, and consequently, according to the prior art, the measuring voltage tapped or tappable at the measuring electrodes for flow measurement is only evaluated during a flow measuring time that is after the end of the engaging phase and before the beginning of the settling phase.

The conductivity, the reciprocal value of the resistance, results according to Ohm's law from a conductivity measuring voltage applied to the measuring electrodes and the conductivity measuring current then flowing between the measuring electrodes or from a conductivity measuring current imprinted in the measuring electrodes, flowing via the measuring electrodes and the conductivity measuring voltage then generated at the measuring electrodes. If a conductivity measuring voltage is applied, then the inner resistance of the signal voltage source should be as small as possible. If there is a conductivity measuring voltage imprinted in the measuring electrodes, flowing via the measuring electrodes, then the inner resistance of the signal current source should be as large as possible. Preferably, a conductivity measuring current imprinted in the measuring electrodes is used and then the conductivity measuring voltage occurring at the measuring electrodes is measured as a quantity for the conductivity to be determined.

In the magnetic-inductive flowmeter according to the invention, as described, conductivity measurement is carried out when flow measurement is not being carried out, or flow measurement is carried out when conductivity measurement is not being carried out. So that the measurement result is not influenced by the signal voltage source or the signal current source during flow measurement, i.e., during the flow measuring time, a preferred design of the magnetic-inductive flowmeter according to the invention is designed in such a manner that the signal voltage source or the signal current source is off or at least is switched to high resistance during the flow measuring time.

As already described, a signal voltage source or a signal current source can be used in the magnetic-inductive flowmeter according to the invention. Preferably, conductivity measuring signals that are alternating signals are used in both cases. If a signal voltage source is used, then this is an alternating voltage source. If a signal current source is used, then this is an alternating current source.

Without making limitations, it is assumed in the following that the magnetic-inductive flowmeter according to the invention has a signal current source.

In the magnetic-inductive flowmeter according to the invention, the signal current source can be connected in various ways to the measuring electrodes. This will be described in more detail in the following in conjunction with the drawing, so that a detailed description is not necessary here.

According to a further teaching of the invention, which is of particular importance, the magnetic-inductive flowmeter according to the invention is wherein the control circuit is designed in such a manner that, in addition to the actual conductivity measuring signals, correction signals are generated by the signal current source, time-shifted to the conductivity measuring signals. Measurement errors of different types or causes can be reduced or eliminated with these correction signals. This will be described in detail in the following in conjunction with the method according to the invention for operating a magnetic-inductive flowmeter and in conjunction with the drawing.

As described above, the subject matter of the invention is also a method for operating a magnetic-inductive flowmeter, in which conductivity measuring signals are generated and the measuring electrodes are impinged with the conductivity measuring signals. In particular, the subject matter of the invention is also a method for operating a magnetic-inductive flowmeter according to the invention as is described above.

The method according to the invention for operating a magnetic-inductive flowmeter is initially and essentially characterized in that, in addition to the actual conductivity measuring signals, correction signals are generated, time-shifted relative to the conductivity measuring signals and the measuring electrodes are—also—impinged with the correction signals. This is described in more detail in the following.

It has already been mentioned that it holds true for the magnetic field that is generated by the magnetizing current in the field coil or field coils that it does not exactly follow the chronological sequence of the magnetizing current in that, for the magnetic field, there is initially an engaging phase at the beginning of the flowing direct current and a settling phase after the end of the flowing direct current, that the magnetic field is constant after the end of the engaging phase and before the beginning of the settling phase and that the measuring voltage tapped or tappable at the measuring electrodes for flow measurement is only evaluated during a flow measuring time that is after the end of the engaging phase and before the beginning of the settling phase.

It is essential for the magnetic-inductive flowmeter according to the invention that the measuring voltage tapped or tappable by the measuring electrodes for flow measurement are evaluated only during a flow measuring time that is less than half the duration of the period of generation of the magnetic field and that the measuring electrodes are impinged with conductivity measuring signals only during a conductivity measuring time that lies outside the flow measuring time. This allows for the sum of the flow measuring time and the conductivity measuring time to correspond exactly to half the duration of the period of the generation of the magnetic field. For logic reasons, the flow measuring time and the conductivity measuring time are chosen such that the sum of the flow measuring time and the conductivity measuring time is smaller than half of the duration of the period of the generation of the magnetic field, such that a small time lag is given between the flow measuring time and the conductivity measuring time.

It has been repeatedly explained that, in the magnetic-inductive flowmeter according to the invention, the measuring voltage tapped or tappable at the measuring electrodes for flow measurement is only evaluated during a flow measuring time that is after the end of the engaging phase and before the beginning of the settling phase. This allows for the implementation possibility, in practice, of temporally setting the conductivity measuring time so that it is within the engaging phase of the magnetic field or in the settling phase of the magnetic field.

As described, the method according to the invention for operating a magnetic-inductive flowmeter is initially and essentially characterized in that, in addition to the "actual" conductivity measuring signals, in each period of the generation of the magnetic field, correction signals are generated, time-shifted relative to the conductivity measuring signals and the measuring electrodes are—also—impinged with the correction signals. Different correction signals or correction measures can be used, here, in order to be able to respond to different factors influencing the measuring accuracy.

In a first, preferred design of the method according to the invention for operating a magnetic-inductive flowmeter, "first" correction signals are generated corresponding to the conductivity measuring signals, which are shifted, in comparison to the conductivity measuring signals, a half duration of the period of the generation of the magnetic field.

In the case that the conductivity measuring signal is generated during the engaging phase of the magnetic fields or during the settling phase of the magnetic fields in the method according to the invention, an illustrative teaching of the invention explains that the "first" correction signal corresponds exactly with the conductivity measuring signals in their signal amplitude and signal duration and the measuring electrodes are impinged with the "first" correction signals during the settling time of the magnetic fields or during the engaging time of the magnetic fields and that the mean value is formed from the measuring voltages generated by the conductivity measuring signals and the measuring voltages generated by the "first" correction signals.

In magnetic-inductive flowmeters, the settling phase of the magnetic field is not exactly the same as the engaging phase of the magnetic field. A measuring error resulting from this circumstance is compensated—partially or completely—by the teaching of the invention described above.

As described above, an alternating magnetic field is used in magnetic-inductive flowmeters.

It is described above, that the alternating magnetic field is not a sine-shaped magnetic field, but one that is a result of the magnetic field coil or the magnetic field coils having direct current with alternating polarity flowing through it/them, namely during the first half of the duration of the period in one direction and during the second half of the duration of the period in the other direction. Such a period—direct current with alternating polarity—also determines the period duration of the generation of the magnetic field. Consequently, it can be said that there is first period duration of the generation of the magnetic field, a second period duration of the magnetic field, etc. In any case, the first period duration of the generation of a magnetic field is followed by a second period duration of the generation of the magnetic field, the second period duration is then followed by a first period duration, etc. Taking this into consideration, a further teaching of the invention, which, in turn, is of particular importance, implements the generation of "phase-shifted" conductivity measuring signals in every second period duration as "second" correction signal. "Phase-shifted" conductivity signals are to be understood as signals in which the polarity is reversed. If the conductivity measuring signals initially are formed of a positive impulse and then of a negative impulse, then it holds true for the "phase-shifted" conductivity signals that they then initially formed of a negative impulse and then of a positive impulse.

In magnetic-inductive flowmeters, the capacitance between the magnetic field coils and the measuring electrodes is not symmetrical. A measuring error resulting from this circumstance is—partially or entirely—compensated by the teaching of the invention described above.

Finally, in the method according to the invention for operating a magnetic-inductive flowmeter, a particular design, which, in turn, is of particular importance, is wherein during the flow measuring time, i.e., without impingement of the measuring electrodes with conductivity measuring signals, measuring voltages are tapped at the measuring electrodes, namely two measuring voltages in each half-period, that the mean value is formed from the measuring voltages in a first half-period and the measuring voltages in the following half-period and that this—mean—measuring value is extracted from the "actual" measuring value. The "actual" measuring value here is the measuring value that results from the measuring electrodes being tapped with conductivity measuring signals.

As repeatedly explained, an alternating magnetic field is used in the magnetic-inductive flowmeters according to the invention. This alternating magnetic field can lead to a "humming", i.e., overlapping the "actual" measuring value with a "humming voltage" coming from the magnetic alternating field. This—naturally undesirable—error source is counteracted by the last-described measure.

In detail, there are a number of possibilities for designing and further developing the magnetic-inductive flowmeter according to the invention and the method according to the invention for operating a magnetic-inductive flowmeter as will become apparent form the following description of preferred embodiments in conjunction with the accompanying drawings.

DETAILED DESCRIPTION OF THE INVENTION

Figure 1:
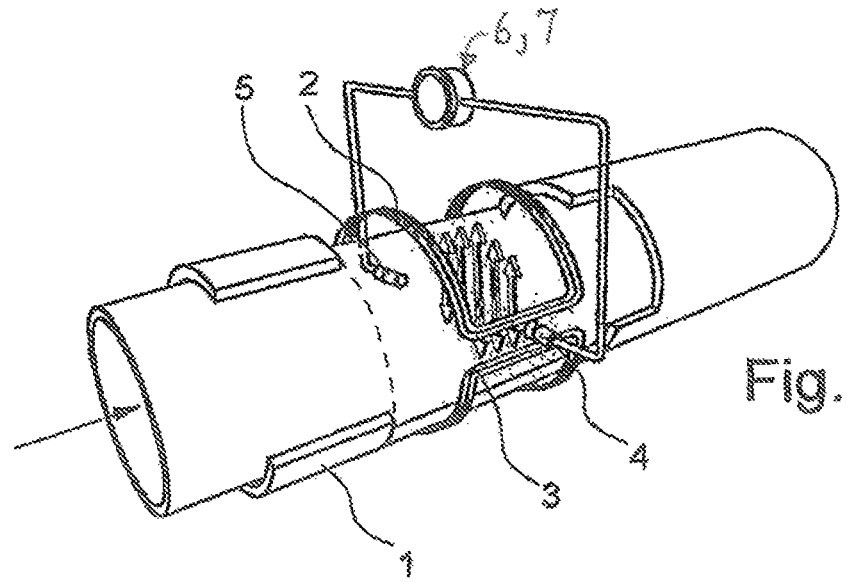
FIG. 1 is a perspective view that schematically shows a basic construction of a magnetic-inductive flowmeter.
Figure 2:
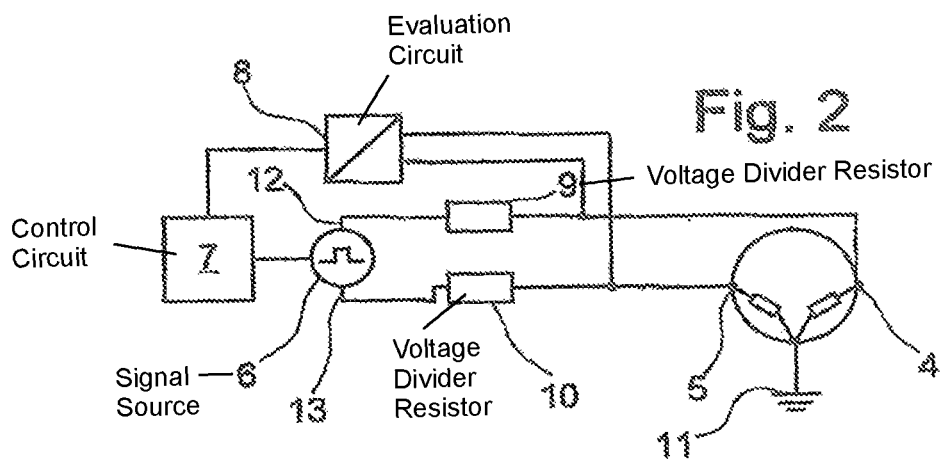
FIG. 2 shows a first embodiment of a circuit of a magnetic-inductive flowmeter according to the invention.
Figure 3:
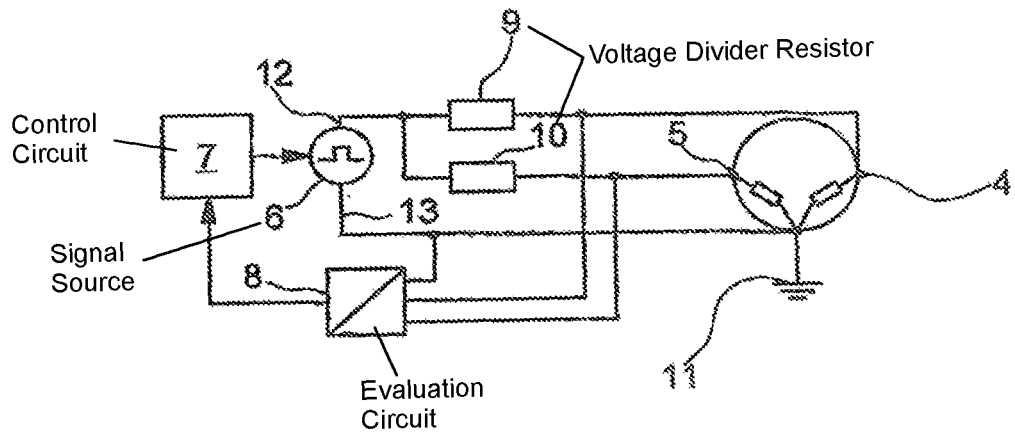
FIG. 3 shows a second embodiment of a circuit of a magnetic-inductive flowmeter according to the invention and FIGS. 4 to 8 are graphs for use in describing different embodiments of the method according to the invention for operating a magnetic-inductive flowmeter.

In FIG. 1, the magnetic-inductive flowmeter is shown only schematically, in its basic construction being comprised of a measuring tube 1 for the flow of an electrically conductive medium, a magnetic field generator for generating an alternating magnetic field running leastwise perpendicular to the longitudinal axis of the measuring tube 1, with two magnetic field coils 2, 3 in the illustrated embodiment, two measuring electrodes 4, 5, preferably in contact with the medium and of components not shown in FIG. 1, namely a signal current source 6 connected to the measuring electrodes 4, 5 for generating conductivity measuring signals shown in FIGS. 2 and 3, a control circuit 7 for the signal current source 6 shown in FIGS. 2 and 3, and an evaluation circuit 8 shown in FIGS. 2 and 3.

It holds true for the magnetic-inductive flowmeter being discussed here, which is not shown in detail in either FIG. 1 or in FIGS. 2 and 3, that the control circuit 7 and/or the evaluation circuit 8 is/are designed in such a manner that the measuring voltage tapped or tappable by the measuring electrodes 4, 5 for flow measurement are evaluated only during a flow measuring time that is less than half the duration of the period of generation of the magnetic field and that the control circuit 7 is designed in such a manner that the measuring electrodes 4, 5 are impinged with conductivity measuring signals only during a conductivity measuring time that lies outside the flow measuring time. It is also not shown that the control circuit 7 is designed in such a manner that the signal voltage source or the signal current source 6 is off or at least is switched to high resistance during the duration of flow measurement.

It also holds true for a particular embodiment of a magnetic-inductive flowmeter according to the invention, which is shown in FIGS. 2 and 3, that a voltage divider resistor 9, 10 is always connected between the signal current source 6 and each measuring electrode 4, 5. The measuring voltage originating at the measuring electrodes 4, 5 are evaluated as measuring value for the conductivity.

While the first signal outlet 12 of the signal current source 6 is connected to a measuring electrode 4 and the second signal output 13 of the signal current source 6 is connected to a measuring electrode 5 in the circuit shown in FIG. 2, it holds true for the circuit shown in FIG. 3 that only one signal output 12 of the signal current source 6 is connected to both electrodes 4, 5 each via a voltage divider resistor 9, 10. In this circuit, the measuring voltage is evaluated as measuring value for the conductivity of the measuring voltage, which originates between a measuring electrode 4 or 5 and a reference potential 11.

In FIGS. 2 and 3, which show certain circuits for the magnetic-inductive flowmeter according to the invention, it is not shown that a decoupling capacitor can be connected in series with at least one voltage divider resistor 9, 10, preferably a decoupling capacitor can be connected in series with each of the two voltage divider resistors 9, 10, and with the help of the control circuit 7, the resistance value of the voltage divider resistors 9, 10 and/or the capacitance value of the decoupling capacitor or capacitors is adjustable. Also not shown that control circuit 7 is designed in such a manner that, in addition to the actual conductivity measuring signals, correction signals are generated by the signal current source 6, time-shifted relative to the conductivity measuring signals.

FIGS. 4 to 8 are graphs for describing different embodiments of the method for operating a magnetic-inductive flowmeter according to the invention.

In these figures, plot a) shows the course of the magnetic field, plot b) shows the course of flow measurement, plot c) shows the course of the conductivity signals used for conductivity measurement and plot d) shows the measuring value for the conductivity.

Plots a) and b) do not require explanation, they represent the extensively known prior art.

Figure 4:
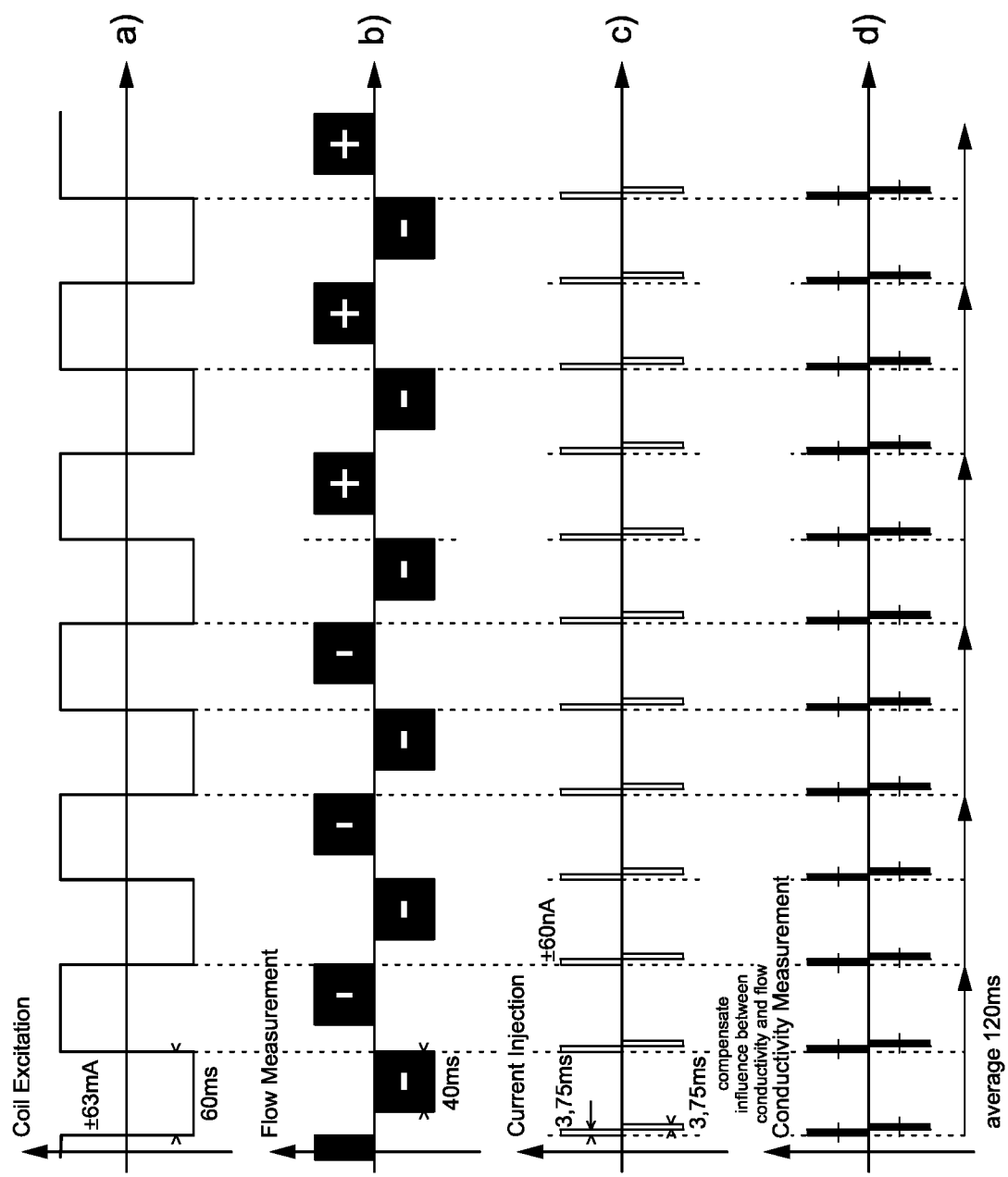
Figure 5:
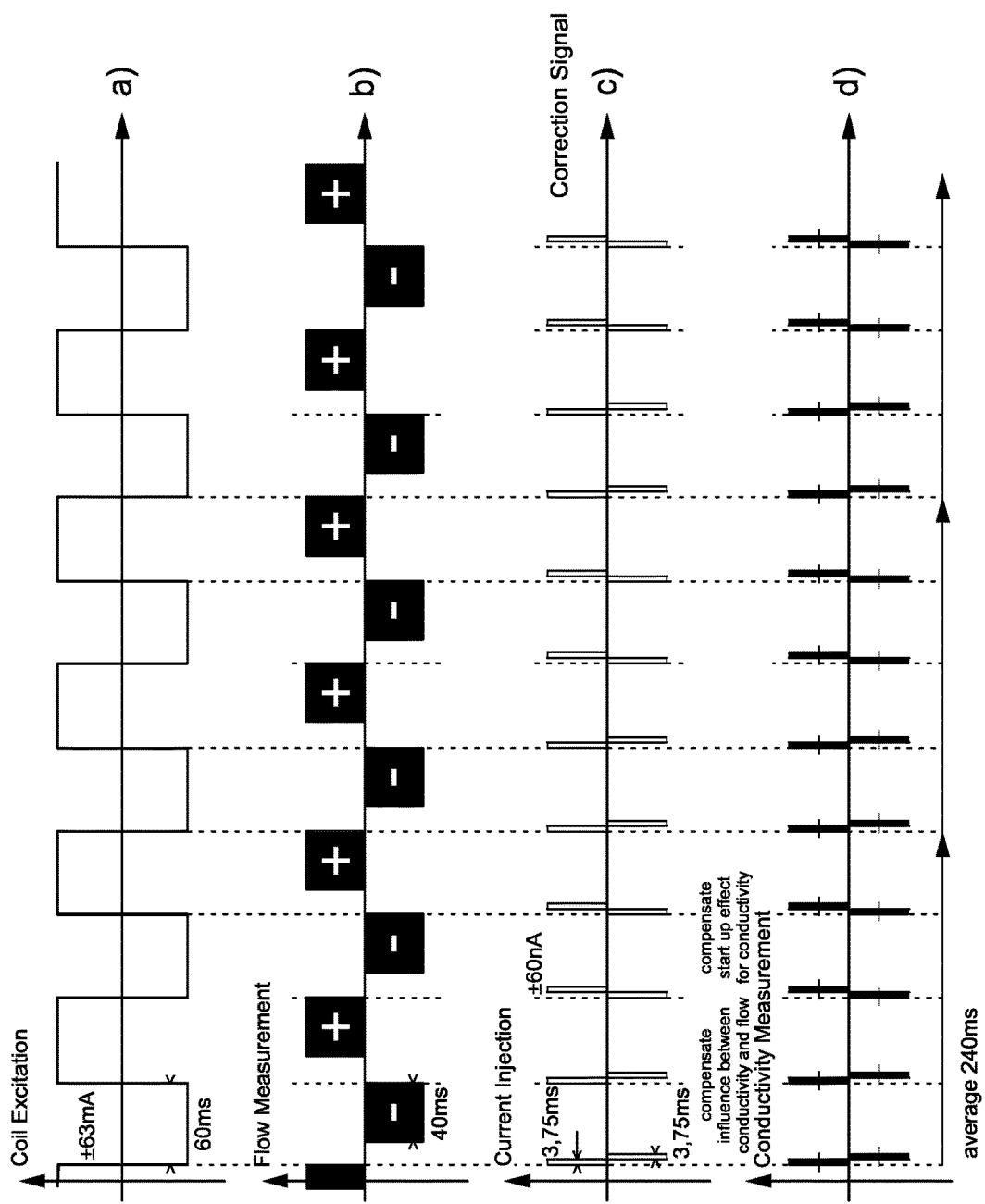
Figure 6:
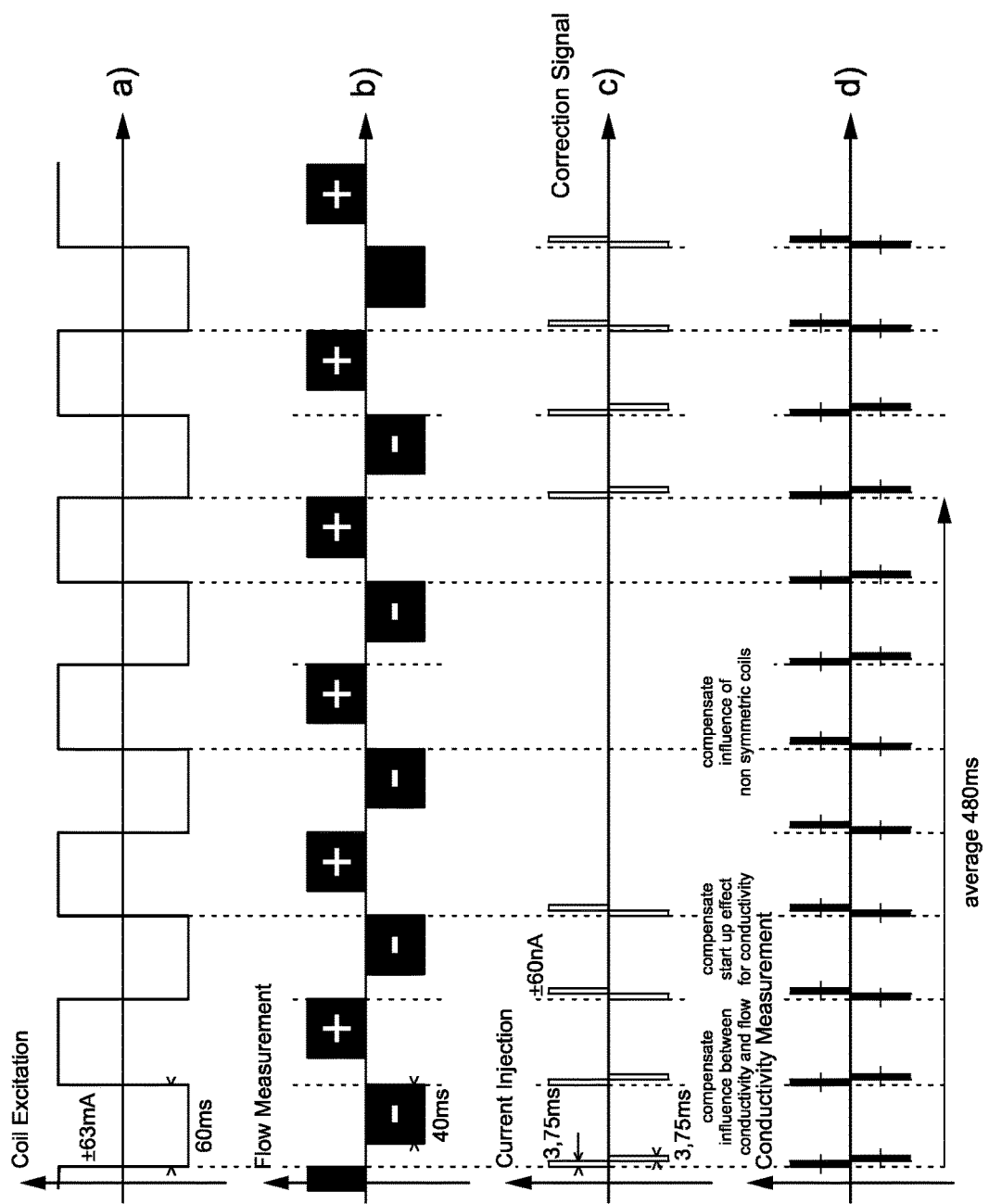
Figure 7:
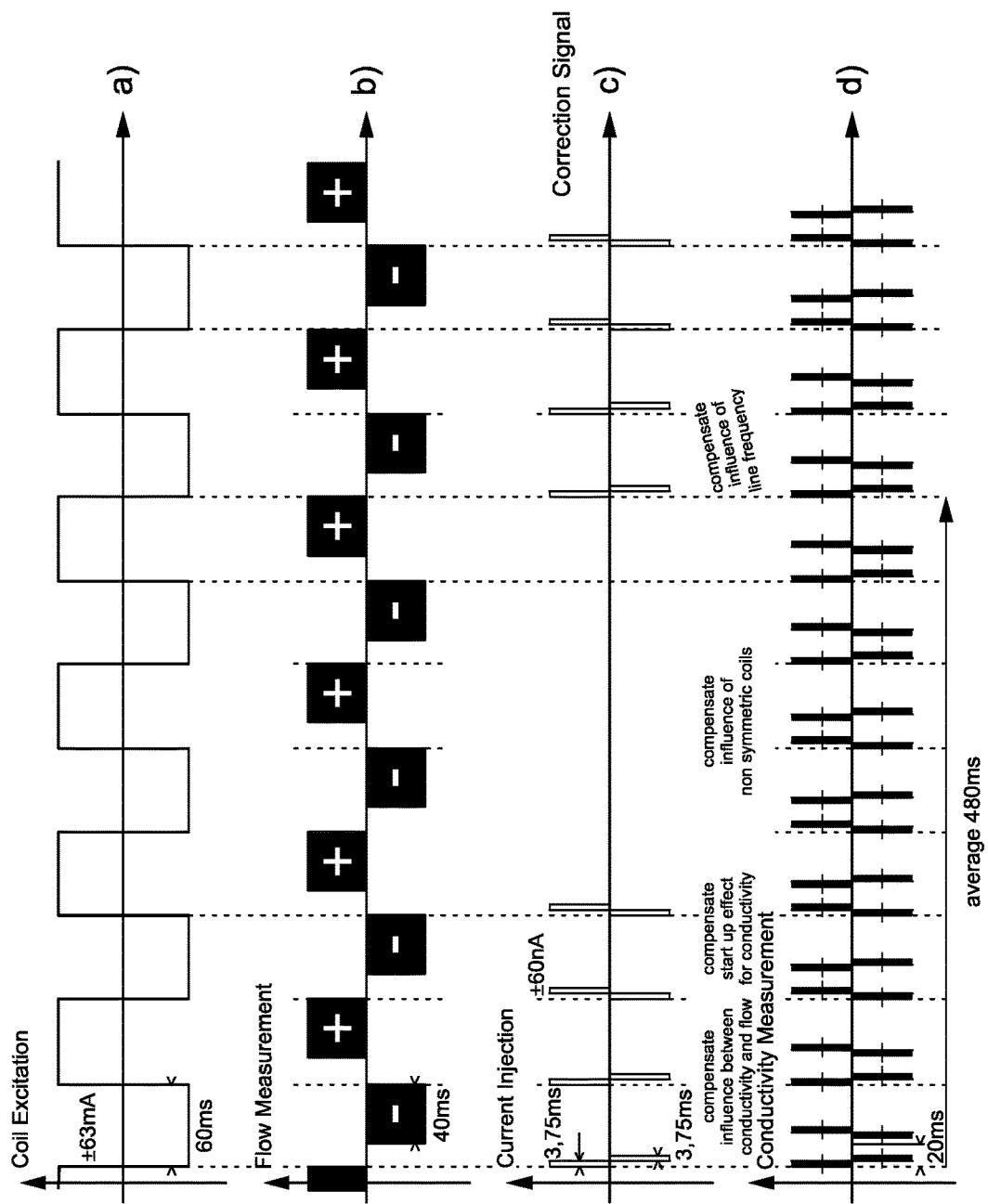
Figure 8:
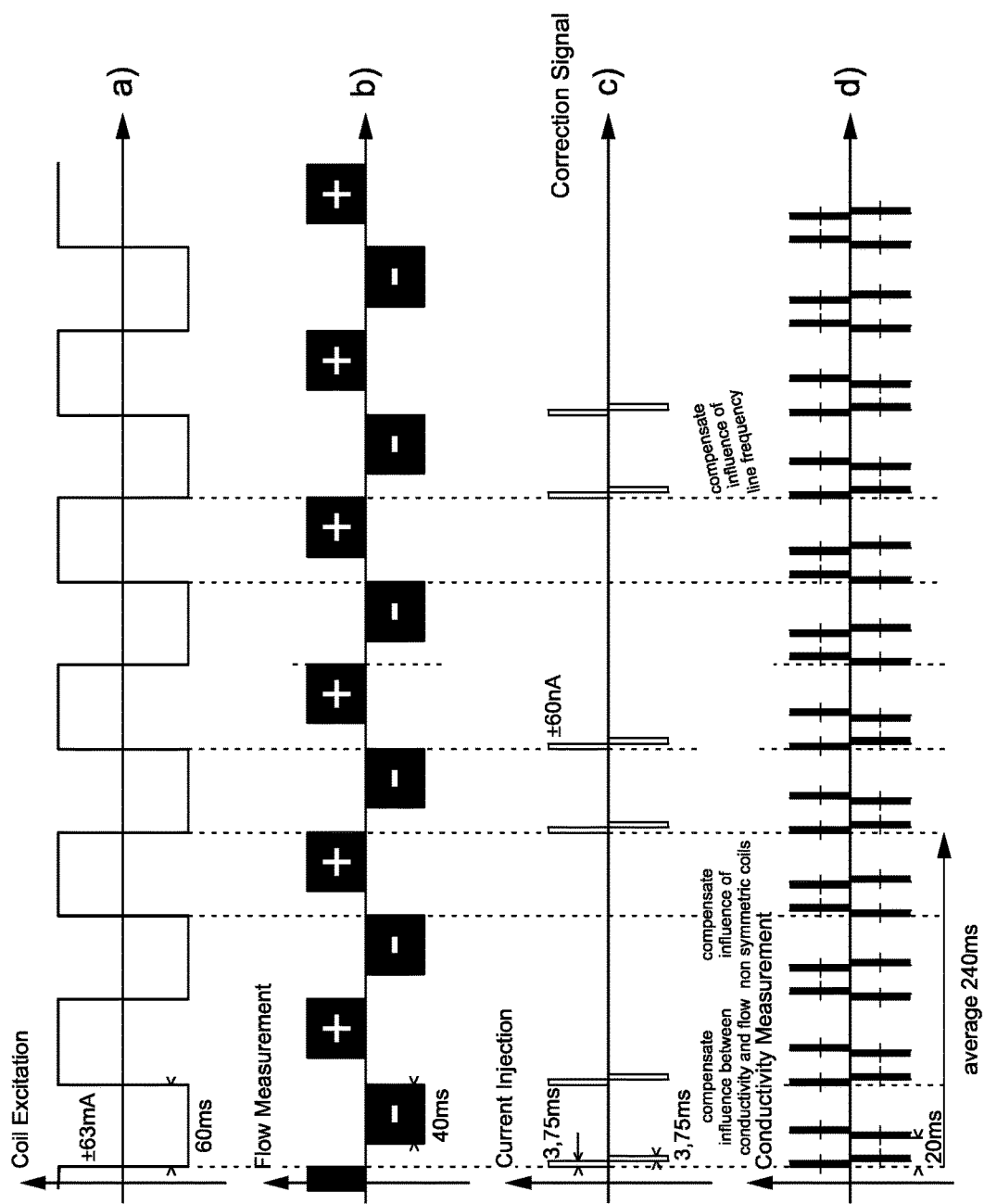

The plots c) and d) in FIG. 4 also show measures known from the prior art, namely, in plot c), conductivity measuring signals that are only generated during conductivity measuring times outside of the flow measurement times.

It holds true for plot c) in FIGS. 5 to 8 that correction signals are present in addition to the actual conductivity measuring signals, time-shifted relative to the actual conductivity measuring signals. The measuring electrodes are impinged with the actual conductivity measuring signals as well as with the correction signals. The type of correction signals and the goal thereof is explained in the above description.

What is claimed is:

1. Magnetic-inductive flowmeter, comprising:
   at least one measuring tube for a flow of an electrically conductive medium,
   at least one magnetic field generator for generating at least one changing magnetic field running at least partially perpendicular to a longitudinal axis of the measuring tube,
   at least two measuring electrodes, in particular contacting the medium,
   an alternating current (AC) signal source galvanically connected to the measuring electrodes for generating conductivity measuring signals,
   a control circuit for the magnetic field generator and for the AC signal source and an evaluation circuit,
   wherein at least one of the control circuit and the evaluation circuit is adapted to evaluate a measuring voltage tapped by the measuring electrodes for flow measurement only during a flow measuring time that is less than half the duration of a period of generation of the magnetic field and
   wherein the control circuit is adapted to feed the conductivity measuring signals into the measuring electrodes only during a conductivity measuring time that is separate from the flow measuring time.

2. Magnetic-inductive flowmeter according to claim 1, wherein the control circuit is adapted to at least switch the AC signal source to high resistance during the duration of flow measurement.

3. Magnetic-inductive flowmeter according to claim 1, wherein the control circuit is adapted to switch off the AC signal source during the duration of flow measurement.

4. Magnetic-inductive flowmeter according to claim 1, further comprising respective voltage divider resistors that are connected between the signal source and each of said measuring electrodes.

5. Magnetic-inductive flowmeter according to claim 4, wherein the measuring voltage arising at the measuring electrodes is evaluated as a measuring value for conductivity.

6. Magnetic-inductive flowmeter according to claim 5, wherein the signal output of the AC signal source is connected to both measuring electrodes via a respective said voltage divider resistor.

7. Magnetic-inductive flowmeter according to claim 5, wherein the measuring voltage generated between one of the measuring electrodes and a reference potential is evaluated as a measuring value for the conductivity.

8. Magnetic-inductive flowmeter according to claim 4, further comprising a decoupling capacitor which is connected in series with at least one voltage divider resistor.

9. Magnetic-inductive flowmeter according to claim 8, wherein the control circuit is adapted to adjust at least one of the resistance value of the voltage divider resistors, and the capacitance value of at least one of the decoupling capacitors.

10. Magnetic-inductive flowmeter according to claim 4, further comprising a decoupling transistor which is connected in series with each of the voltage divider resistors.

11. Magnetic-inductive flowmeter comprising:
   at least one measuring tube for a flow of an electrically conductive medium,
   at least one magnetic field generator for generating at least one changing magnetic field running at least partially perpendicular to a longitudinal axis of the measuring tube,
   at least two measuring electrodes, in particular contacting the medium,
   an alternating current (AC) signal source galvanically connected to the measuring electrodes for generating conductivity measuring signals,
   a control circuit for the magnetic field generator and for the AC signal source and an evaluation circuit,
   wherein at least one of the control circuit and the evaluation circuit is adapted to evaluate a measuring voltage tapped by the measuring electrodes for flow measurement only during a flow measuring time that is less than half the duration of a period of generation of the magnetic field,
   wherein the control circuit is adapted to feed the conductivity measuring signals into the measuring electrodes only during a conductivity measuring time that is separate from the flow measuring time, and
   wherein the control circuit is adapted such that the AC signal source generates correction signals in addition to the conductivity measuring signals that are time-shifted relative to the conductivity measuring signals.

12. Method for operating a magnetic-inductive flowmeter having at least one measuring tube and at least two measuring electrodes, comprising the steps of:
   directing a flow of an electrically conductive medium through the at least one measuring tube and into contact with the at least two measuring electrodes,
   generating conductivity measuring signals for the flow of an electrically conductive medium in the measuring tube using a magnetic field generator to produce at least one changing magnetic field running at least partially perpendicular to a longitudinal axis of the measuring tube and an alternating current (AC) signal source galvanically connected to measuring electrodes,
   feeding the conductivity measuring signals into the measuring electrodes only during a period of generation of the magnetic field,
   using the AC signal source for generating additional correction signals that are time-shifted relative to the conductivity measuring signals, and
   additionally, feeding the correction signals to the measuring electrodes.

13. Method according to claim 12, wherein first correction signals corresponding to the conductivity measuring signals are generated by said AC signal source which are shifted by a half duration of a period of generation of the magnetic field in comparison to the conductivity measuring signals.

14. Method according to claim 13, wherein the conductivity measuring signals are generated by the AC signal source during one of an engaging phase of the magnetic fields and a settling phase of the magnetic fields, wherein the first correction signals correspond exactly with the conductivity measuring signals in their signal amplitude and signal duration and wherein the measuring electrodes are impinged with the first correction signals during said one of the settling phase and engaging phase of the magnetic fields, and wherein a mean value is formed from the measuring voltages generated by the conductivity measuring signals and the measuring voltages generated by the first correction signals.

15. Method according to claim 14, wherein a second period duration of generation of the magnetic field follows a first period duration of the generation of the magnetic field, and wherein phase-shifted conductivity measuring signals are generated in each second period duration as "second" correction signals.

16. Method according to claim 14, wherein during flow measuring time without impingement of the measuring electrodes with conductivity measuring signals, two measuring voltages are tapped at the measuring electrodes in each half-period, wherein the mean value is formed from the measuring voltages in a first half-period and the measuring voltages in the following half period and wherein this mean value is extracted from the actual measuring value.

* * * * *